US009623626B2

(12) United States Patent  (10) Patent No.: US 9,623,626 B2
Clerici et al.  (45) Date of Patent: Apr. 18, 2017

(54) FLEXIBLE COMPOSITE MATERIAL AND USE HEREOF, PROCESS FOR MAKING A FLEXIBLE COMPOSITE MATERIAL

(75) Inventors: Cyril Clerici, AA Echt (NL); Harm Van der Werff, AA Echt (NL)

(73) Assignee: DSM IP ASSETS B.V., Heerlen (NL)

( * ) Notice: Subject to any disclaimer, the term of this patent is extended or adjusted under 35 U.S.C. 154(b) by 0 days.

(21) Appl. No.: 13/407,033

(22) Filed: Feb. 28, 2012

(65) Prior Publication Data

US 2013/0224428 A1  Aug. 29, 2013

(51) Int. Cl.
| | |
|---|---|
| *B32B 5/26* | (2006.01) |
| *B32B 37/14* | (2006.01) |
| *F41H 1/02* | (2006.01) |
| *F41H 5/04* | (2006.01) |
| *B32B 5/02* | (2006.01) |
| *B32B 5/12* | (2006.01) |
| *B32B 3/12* | (2006.01) |
| *B32B 3/26* | (2006.01) |

(52) U.S. Cl.
CPC ............ *B32B 5/26* (2013.01); *B32B 3/12* (2013.01); *B32B 3/266* (2013.01); *B32B 5/022* (2013.01); *B32B 5/024* (2013.01); *B32B 5/12* (2013.01); *F41H 5/0471* (2013.01); *F41H 5/0492* (2013.01); *B32B 2262/0223* (2013.01); *B32B 2262/0253* (2013.01); *B32B 2262/0261* (2013.01); *B32B 2262/0269* (2013.01); *B32B 2307/54* (2013.01); *B32B 2571/00* (2013.01); *B32B 2605/00* (2013.01); *Y10T 428/24132* (2015.01); *Y10T 428/26* (2015.01)

(58) Field of Classification Search
None
See application file for complete search history.

(56) References Cited

U.S. PATENT DOCUMENTS

| | | | | |
|---|---|---|---|---|
| 2,789,076 | A | * | 4/1957 | Frieder et al. ............... 428/911 |
| 4,413,110 | A | | 11/1983 | Kavesh et al. |
| 5,061,545 | A | * | 10/1991 | Li ........................ B29C 43/222 |
| | | | | 428/156 |
| 5,093,158 | A | * | 3/1992 | Li ........................ B29B 15/122 |
| | | | | 427/264 |
| 6,846,548 | B2 | * | 1/2005 | Harpell .................... D04H 3/04 |
| | | | | 428/198 |

(Continued)

FOREIGN PATENT DOCUMENTS

| | | |
|---|---|---|
| CA | 1082585 | 7/1980 |
| EP | 0 191 306 | 8/1986 |

(Continued)

OTHER PUBLICATIONS

"Advanced Fiber Spinning Technology", Ed. T. Nakajima, Woodhead Publ. Ltd (1994), ISBN 185573 182 7.

*Primary Examiner* — David Sample
*Assistant Examiner* — Donald M Flores, Jr.
(74) *Attorney, Agent, or Firm* — Nixon & Vanderhye P.C.

(57) ABSTRACT

The invention relates to a flexible composite material. This material comprises at least 2 layers comprising high strength fibers, said at least 2 layers comprise consolidated elements and unconsolidated elements, the unconsolidated elements being in contact with the consolidated elements. The flexible composite material shows a better anti-ballistic performance compared to materials known so far.

21 Claims, 6 Drawing Sheets

(56) References Cited

U.S. PATENT DOCUMENTS

| | | | |
|---|---|---|---|
| 7,211,291 B2* | 5/2007 | Harpell | D04H 3/04 |
| | | | 427/180 |
| 7,601,416 B2* | 10/2009 | Palley | 428/171 |
| 7,993,715 B2* | 8/2011 | Geva et al. | 428/36.1 |
| 2005/0276956 A1* | 12/2005 | Zink | B32B 3/266 |
| | | | 428/198 |

FOREIGN PATENT DOCUMENTS

| | | | | |
|---|---|---|---|---|
| EP | 0 200 547 | 11/1986 | | |
| EP | 0 205 960 | 12/1986 | | |
| EP | 0 213 208 | 3/1987 | | |
| EP | 0 472 114 | 4/1999 | | |
| EP | 0 683 374 | 7/1999 | | |
| EP | 1 170 925 | 9/2002 | | |
| EP | 1 350 868 | 8/2003 | | |
| EP | 1 144 740 | 10/2003 | | |
| EP | 1 699 954 | 11/2011 | | |
| GB | 2 042 414 | 9/1980 | | |
| GB | 2 051 667 | 1/1981 | | |
| GB | 2 164 897 | 4/1986 | | |
| JP | EP 1350868 A1 * | 10/2003 | | D01F 6/04 |
| WO | 90/06387 | 6/1990 | | |
| WO | 90/06389 | 6/1990 | | |
| WO | 01/73173 | 10/2001 | | |
| WO | 2008/048301 | 4/2008 | | |

\* cited by examiner

FLEXIBLE COMPOSITE MATERIAL AND USE HEREOF, PROCESS FOR MAKING A FLEXIBLE COMPOSITE MATERIAL

The present invention relates to a flexible composite material and use hereof, furthermore the invention relates to a process for making a flexible composite material.

A flexible composite material is known from WO2008/048301. This publication discloses a flexible composite material comprising at least one fibrous layer comprising a network of high tenacity fibers in a matrix, whereby a part of the fibrous layer is consolidated in a specified pattern. The reported invention aims e.g. at reducing trauma to a wearer of body armor, caused by bullets or other ballistic objects. It is explained at the last paragraph of page 17 of this publication that the consolidated pattern should comprise a substantial portion of the surface area of the product, substantial meaning at least 50%. To achieve protection against ballistic projectiles and sharp objects preferably most of the surface area of the composite was consolidated. WO2008/048301 discloses that most preferably the consolidated area(s) extends over about 90 to about 95% of the surface area of the composite.

In example 1 of WO2008/048301 a composite with cross-plied unidirectional oriented extended chain polyethylene fibers is shown whereby a pattern of equilateral triangles are pressed into the fibrous layers at a temperature of 116° C. during 10 minutes at a pressure of 3.45 m Pa. The pressed area comprises 58% of the surface area of the composite and the unconsolidated portions between the triangles have a width of 4 mm. The weight of the laminate of example 1 was 5.00 kg/m$^2$.

In the examples it is shown that there is no negative effect on the anti-ballistic properties: example 1 shows that the anti-ballistic performance, expressed as V50, of the consolidated parts in the composite material is equal to a fully consolidated, pressed panel known in the prior art (example 3), while the anti-ballistic performance of the unconsolidated (unpressed) parts in the composite material of WO2008/048301 is equal to fully unpressed (loose) fibrous layers as known in the prior art (example 2). No synergetic effects in anti-ballistic performance were reported.

Despite the fact that known composite articles show sufficient anti-ballistic performance, there is a need for increased bullet stopping power, expressed as V50 or energy absorption, Eabs.

An objective of the present invention is to provide a flexible composite material that shows increased bullet stopping power than composites known so far.

This objective is reached with a flexible composite material comprising at least 2 layers comprising high strength fibers, said at least 2 layers comprise consolidated elements and unconsolidated elements, the unconsolidated elements being in contact with the consolidated elements, the unconsolidated elements having a smallest width U which width U is more than 4 mm.

The composite material according to claim 1 shows an increased anti-ballistic performance, expressed as Eabs, compared to composite materials hitherto known, while at the same time the composite material is flexible. Another advantage of the composite material according to the invention is that it may show a lower—i.e. improved—back face deformation, in the art also referred to as lower back face signature or lower (blunt) trauma.

Another embodiment of the flexible composite material according to the invention relates to a composite material comprising at least 2 layers comprising high strength fibers, said at least 2 layers comprise consolidated elements and unconsolidated elements whereby the surface area of the unconsolidated elements is more than 50% of the total surface area of the flexible composite material. Such a composite proves to show good flexibility combined with a high anti-ballistic performance.

The flexible composite material according to the invention comprises at least 2 layers. Preferably the flexible composite material according to the invention comprises at least 8 layers. More preferably the flexible composite material according to the invention comprises at least 16 layers, most preferably the flexible composite material according to the invention comprises at least 32 layers. This yields the best anti-ballistic performance. Generally the amount of flexible layers in the flexible composite according to the invention will be chosen below 300 layers, preferably below 240 layers.

The flexible composite material according to the invention is flexible, which means that it has a flexibility, according to the method as defined herein below, of at least 25 mm.

In another embodiment, the weight, expressed as areal density, of the flexible composite material according to the invention is at least 400 g/m$^2$.

Preferably the weight of the flexible composite material according to the invention is at least 800 g/m$^2$. Generally the weight of the flexible composite material according to the invention is less then 8000 g/m$^2$, preferably is less then 6000 g/m$^2$. The areal density can be simply measured by weighing a composite material of a given surface area (say 40*40 cm) and dividing its weight by its surface area.

This flexible composite material according to the invention can suitably be used as a precursor, or intermediate, material in the manufacture of articles, such as ballistic resistant articles. One preferred embodiment of ballistic resistant articles relates to personal protection articles and its use herein such as bullet resistant vests.

Another preferred embodiment of ballistic resistant articles and its use herein relates to vehicle protection articles such as articles for armoring cars or military vehicles, ships and aircrafts. An advantage of the composite material according to the invention is that it can be conveniently applied, for example, to retrofit vehicle doors such as may be the case for so-called up-armoring vehicles that are already in use.

In the event the flexible composite article according to the invention is a precursor for use in anti-ballistic applications, the composite article according to the invention is preferably available 'on a roll' in so-called continuous lengths, i.e. lengths where the length of the composite material is at least 5 times its width. Preferably the length of the composite material is at least 10 times its width, more preferably the length of the composite material is at least 20 times its width, even more preferably the length of the composite material is at least 50 times its width. Most preferably the length of the composite material is at least 100 times its width. Typically such length of the composite material is at most 1000 times its width The composite material according to the invention may be used as such, or may be used together with other sheets or material that is suitable to impart impact of bullets. Examples hereof may be woven structures of the above mentioned polymeric fibers. In one embodiment such fibers are aramid fibers, preferably woven aramid fibers. In another embodiment such fibers are polyethylene fibers, preferably unidirectional polyethylene fibers. The flexible composite material according to the invention may be combined with rigid materials such as metal plates or sheets or ceramics. In such case still advantage is taken from the increased antiballistic performance of the composite materials according to the invention.

In yet another embodiment, more than one composite material according to the invention may be used. In such case at least 2 composite materials according to the invention are stacked or combined. More preferably at least 3 composite materials according to the invention are stacked or combined. In such case the stacking is preferably done such that the composite materials according to the invention are stacked with an off-set. An off-set means that the projections of unconsolidated elements from one composite material according to the invention only partially, i.e. less than 40% of their surface, coincide with the projections of unconsolidated elements from an adjacent composite material according to the invention. Due to this off-set only a limited amount of projections of unconsolidated elements overlap each other.

The flexible composite material according to the invention comprises at least 2 layers. In one embodiment the at least 2 layers have a woven structure. Preferably, the woven structure is chosen from the group consisting of a plain weave, a satin weave, a twill weave and a crow-foot weave.

In another embodiment the at least 2 layers are non woven. The non woven layers may be a felt and preferably comprises unidirectionally aligned fibers.

A layer with unidirectionally aligned polymeric fibers is in this application referred to as a monolayer. In a monolayer, generally at least 80 mass % of the total mass of fibers in said monolayer are oriented in parallel, along a common direction. More preferably at least 90 mass %, even more preferably at least 95 mass % and most preferably about 100 mass % of fibers in said monolayer are oriented in parallel. Preferably, the orientation of the fibers in a monolayer is at an angle $\alpha$ to the orientation of the fibers in an adjacent monolayer, whereby $\alpha$ is preferably between 5 and 90°, more preferably between 45 and 90°, even more preferably between 75 and 90°, most preferably about 90°.

In a preferred embodiment of the invention, the flexible composite material according to the invention comprises at least 2 monolayers, preferably comprises at least 4 monolayers, each monolayer containing unidirectionally aligned polymeric fibers, preferably UHMWPE fibers, more preferably UHMWPE tapes, and optionally a matrix in at most 20 mass % of the total mass of the monolayer. The fiber direction in each monolayer is preferably rotated with respect to the fiber direction in an adjacent monolayer. A monolayer has a polymeric fiber mass of preferably between 7.5 and 150 gram/m$^2$, more preferably between 12.5 and 125 gram/m$^2$, most preferably between 25 and 100 gram/m$^2$.

The at least 2 layers in the composite according to the invention comprise high strength fibers, preferably polymeric fibers. By fiber is herein understood an elongated object the length dimension of which is much greater than its transverse dimensions of width and thickness. The term fiber also comprises the embodiments of a monofilament, a multifilament, a ribbon, a strip, a tape and a film. The fibers may have a continuous or a discontinuous length with a regular or an irregular cross-section. In a preferred embodiment, the fiber has a tape-like shape, such a fiber being referred to herein simply as tape. Typically the tape has a width of 1600 mm or less. The tape has preferably a width of between 1 mm and 500 mm, more preferably between 2 mm and 200 mm, even more preferably between 5 mm and 150 mm, most preferably between 10 mm and 120 mm. The tape has preferably a thickness of between 10 µm and 200 µm, more preferably between 25 µm and 100 µm, most preferably between 30 µm and 60 µm.

High strength in this application means a tensile strength of at least 1.2 GPa. Preferably the tensile strength of the polymeric fibers is at least 1.8 GPa, more preferably at least 2.5 GPa, most preferably at least 3.5 GPa. The tensile modulus of the polymeric fibers is preferably at least 30 GPa, more preferably at least 50 GPa, most preferably at least 60 GPa.

Best results are obtained when the polymeric fibers are ultra high molecular weight polyethylene fibers having a tensile strength of at least 1.8 GPa, preferably at least 2.4 GPa more preferably at least 3 GPa and a tensile modulus of at least 40 GPa, more preferably of at least 60 GPa, most preferably at least 80 GPa. Suitable polymeric fibers include fibers manufactured from polyamides and polyaramides, e.g. poly(p-phenyleneterephthalamide) (known as Kevlar®); poly(tetrafluoroethylene) (PTFE); poly{2,6-diimidazo-[4,5b-4',5'e]pyridinylene-1,4(2,5-dihydroxy)phenylene} (known as M5); poly(p-phenylene-2, 6-benzobisoxazole) (PBO) (known as Zylon®); poly(hexamethyleneadipamide) (known as nylon 6,6), poly(4-aminobutyric acid) (known as nylon 6); polyesters, e.g. poly(ethylene terephthalate), poly (butyleneterephthalate), and poly(1,4 cyclohexylidenedimethyleneterephthalate); polyvinyl alcohols; thermotropic liquid crystal polymers (LCP) as known from e.g. U.S. Pat. No. 4,384,016; but also polyolefins e.g. homopolymers and copolymers of polyethylene and/or polypropylene. Also combinations of polymeric fibers manufactured from the above referred polymers can be used to manufacture the second panels. Preferred fibers are polyolefin fibers, polyaramid fibers and LCP fibers. More preferred fibers are polyaramid fibers.

Good results were obtained when the polymeric fibers are polyolefin fibers, more preferably polyethylene fibers. Preferred polyethylene fibers are ultrahigh molecular weight polyethylene (UHMWPE) fibers. Polyethylene fibers may be manufactured by any technique known in the art, preferably by a melt or a gel spinning process. Most preferred fibers are gel spun UHMWPE fibers, e.g. those sold by DSM Dyneema. If a melt spinning process is used, the polyethylene starting material used for manufacturing thereof preferably has a weight-average molecular weight between 20,000 and 600,000 g/mol, more preferably between 60,000 and 200,000 g/mol. An example of a melt spinning process is disclosed in EP 1,350,868 incorporated herein by reference. If the gel spinning process is used to manufacture said fibers, preferably an UHMWPE is used with an intrinsic viscosity, IV, of preferably at least 3 dl/g, more preferably at least 4 dl/g, most preferably at least 5 dl/g. Preferably the IV is at most 40 dl/g, more preferably at most 25 dl/g, more preferably at most 15 dl/g. Preferably, the UHMWPE has less than 1 side chain per 100 C atoms, more preferably less than 1 side chain per 300 C atoms. Preferably the UHMWPE fibers are manufactured according to a gel spinning process as described in numerous publications, including EP 0205960 A, EP 0213208 A1, U.S. Pat. No. 4,413,110, GB 2042414 A, GB-A-2051667, EP 0200547 B1, EP 0472114 B1, WO 01/73173 A1, EP 1,699,954 and in "*Advanced Fibre Spinning Technology*", Ed. T. Nakajima, Woodhead Publ. Ltd (1994), ISBN 185573 182 7.

The at least 2 layers in the composite according to the invention preferably comprise a matrix material. The matrix material is applied to bond together and stabilize the polymeric fibers; the matrix material may be locally applied. Suitable matrix materials are described in e.g. EP 0191306

B1, EP 1170925 A1, EP 0683374 B1 and EP 1144740 A1 hereby incorporated by reference. The matrix material may be applied in various forms and ways; for example as a bonding strip, by at least partially coating the fibers, or in the form of a film or a carrier film. Best results in terms of anti-ballistic performance were obtained when the matrix material used had a tensile modulus of at most 0.5 GPa, more preferably of at most 0.4 GPa, most preferably of at most 0.3 GPa. Preferred example of matrix materials having the preferred tensile modulus are polyurethanes, polyvinyls, polyacrylics, polybutyleneterephthalate (PBT), polyolefins, polyamides, polycarbonates or thermoplastic elastomeric block copolymers such as polyisoprene-polyethylene-butylene-polystyrene or polystyrene-polyisoprene-polystyrene block copolymers.

The amount of matrix material is preferably at most 30 mass % of the total mass of the said at least 2 layers, most preferably at most 20 mass %, most preferably at most 10 mass %. In a preferred embodiment the said at least 2 layers contain no matrix. It was observed that such case the composite material has improved anti-ballistic performance.

In a preferred embodiment of the flexible composite material according to the invention, the at least 2 layers comprising high strength fibers comprises a woven fabric. This fabric comprising fibers made of polyaramides, preferably poly(p-phenyleneterephthalamide); poly{2,6-diimidazo-[4,5b-4',5'e]pyridinylene-1,4(2,5-dihydroxy)phenylene}; poly(p-phenylene-2,6-benzobisoxazole) or thermotropic liquid crystal polymers; and a matrix in at most 20 mass % of the total mass of the fabric. Preferably this fabric comprising fibers made of polyaramides and said matrix.

The composite material according to the invention comprises consolidated elements. Such elements may have any shape, but preferably the elements have a regular shape. Preferably such a regular shape is triangular, quadrilateral, pentagonal, hexagonal or alternatively the shape may be in the form of a circle or an ellipse. The consolidated elements are arranged preferably in a regular pattern across the surface area of the composite material according to the invention. Examples of hexagonal and triangular consolidated elements in a regular pattern across the surface area of the composite material according to the invention are given as the grey shades areas in FIGS. 1 and 2 respectively. The consolidated elements may all be of the same surface dimension, or may have different dimensions, e.g. as shown in FIG. 6. Typically the consolidated elements have a lower thickness compared to the thickness of unconsolidated elements, such as shown in FIG. 5.

The composite material according to the invention preferably comprises at least 5 consolidated elements, more preferably it comprises at least 10 consolidated elements. Most preferably the composite material according to the invention comprises at least 15 elements. In case of consolidated elements with angular shape (such as triangular, quadrilateral, pentagonal, or hexagonal), the shortest side of a consolidated element, S, is at least 2 cm, preferably at least 2.5 cm. Preferably the value for S is at most 7 cm. In case of consolidated elements in form of non angular shapes like a circle or ellipse, the shortest side of a consolidated element, S, is at least 0.5 cm, preferably 1 cm. Preferably the value for S is at most 3 cm. The shortest side S in case of non angular shapes is the diameter for a circle, as shown in FIG. 6, or the shortest cross section for other shapes such as an ellipse.

Unconsolidated elements in the composite material according to the invention are in contact with the consolidated elements, and can be seen the white shaded areas in e.g. FIGS. 1, 2 and 3. The unconsolidated elements may form a web-like structure around the consolidated elements. The smallest width U of the unconsolidated elements is more than 4 mm. Preferably U is more than 5 mm, more preferably U is more than 6 mm, even more preferably U is more than 8 mm. This results in the best anti-ballistic performance, Eabs. Most preferably the smallest width U of the unconsolidated elements is more than 12 mm. This results in the best combination of flexibility and anti-ballistic performance, Eabs. Generally the smallest width U of the unconsolidated elements is less than 200 mm, preferably U is less than 150 mm, and most preferably U is less than 100 mm.

The flexible composite material according to the invention may further comprise a polymeric film on at least one of its two outer surfaces. Such a polymeric film is positioned on one of its outer surfaces, sometimes referred to as the top. In a preferred embodiment the polymeric film is also positioned on the second outer surface of the composite material according to the invention, sometimes referred to as bottom side, i.e. on both of the outer surfaces of the composite material according to the invention.

The polymeric film preferably has an areal density of between 1 and 10 gram/m$^2$. Said film may be for example a polyolefin such as e.g. polyethylene or polypropylene, a polyester, a polyamide, a polycarbonate, a polyurethane or a polystyrene film. The polymeric film is a preferably made from a polyolefin—more preferably a polyethylene or a polypropylene—a polyester—especially a thermoplastic polyester or a polycarbonate. In a preferred embodiment, the polymeric film is essentially made from a high molar mass polyethylene, more preferably form an ultra-high molar mass polyethylene of intrinsic viscosity of at least 4 dl/g. Such a film may be produced according to a process as disclosed in GB2164897. Such films show generally relatively high strength and modulus, and high abrasion resistance.

The present invention also relates to a process for the manufacture of a flexible ballistic resistant composite material, the process comprising the steps of:

providing at least 2 layers comprising high strength fibers
consolidating these at least 2 layers to obtain consolidated elements and unconsolidated elements whereby the unconsolidated elements have a smallest width U which width U is more than 4 mm,
cooling the obtained product, followed by
flexing the so obtained product along the unconsolidated elements to obtain a flexible ballistic resistant composite material according to the invention.

Consolidating these at least 2 layers may suitably be done by compressing. Compressing may be done in a discontinuous way, in for example a mould, or in a continuous way, by use of for example a calander or a continuous press such as a double belt-press. During compressing use is made of a so-called negative template. The negative template comprises protruding units, which during pressing arrange for consolidated elements. In those areas where there is no protruding unit an unconsolidated element is created. For example to obtain hexagonal pressed elements in the composite material according to the invention, the negative template has protruding hexagonal elements of the shape and dimensions that are to occur in the composite armor according to the invention. During compressing two negative templates are used, one of which is used to compress the at least two layers on one side—say the top side—, the other negative template is used to compress the at least two layers on one the opposite side, say the bottom side. In this way the desired pattern in the composite material of the invention is created. Preferably the two negative templates are positioned such that the projections of the protruding units coincide.

The protruding units in the negative template are positioned such that a shortest distance between the protruding elements is more than 4 mm. In this way it is arranged that the smallest width U in the composite material of the invention is more than 4 mm.

The negative template may be made of any suitable material that can withstand the temperatures and the pressures during consolidating. Suitable materials included aluminum, iron, steel and their alloys. In a process where a mould is used, an inlay may be used in the form of a negative template. Alternatively the compression surface of the mould may be shaped such it has the shape of the negative template. In the event of a calander or a double belt press, the calander or double belt press may be fitted with protruding elements that have the shape and arrangement of the compressed elements in the composite material of the invention.

During compressing the at least two layers are subjected to a certain temperature and a certain pressure. The temperature during compression may be controlled through the temperature of the mould, calendar or belt press. The temperature during the compression step is preferably chosen below the melting temperature of the polymeric fibers as measured by DSC. If DSC cannot determine the melting temperature of a polymeric fiber then by said melting temperature is understood herein the temperature at which the polymeric fibers start to lose their mechanical properties, e.g. when the tensile strength of the fibers decreases with more than 5% of the tensile strength of the fiber as measured at room temperature. In case the assembly of polymeric fibers used to manufacture the second panel contains more than one type of polymeric fibers, by melting temperature is herein understood the melting temperature of the polymeric fibers having the lowest melting temperature.

Preferably the temperature during the compression step is at least 5° C., preferably at least 10° C. and even more at least 20° C. below the melting temperature of the polymeric fibers. For example, in the case of polyethylene and more particular of UHMWPE fibers, often having a melting temperature of about 155° C., a compression temperature of preferably below 145° C., more preferably below 135° C. will be chosen. The minimum temperature generally is chosen such that a reasonable speed of consolidation is obtained. In this respect 50° C. is a suitable lower temperature limit, preferably this lower limit is at least 75° C., more preferably at least 95° C., most preferably at least 115° C.

The pressure during compressing preferably is at least 1.0 MPa, more preferably at least 2.0 MPa, even more preferably at least 5.0 MPa and most preferably at least 7.5 MPa. In this way a good balance between flexibility and anti-ballistic performance was obtained. Optionally, the compression step may be preceded by a pre-compressing step. Pressure during this pre-compressing step may vary between 0.15 MPa and 2.0 MPa. Time for pre-compression typically is between 10 and 20% of the total compression time during pre-compression and compression.

The optimum time for compressing generally ranges from 0.1 minute to 120 minutes, preferably between 0.25 minute and 60 minutes. Such optimum time may suitably be determined by routine experimentation.

After the consolidation the obtained product is cooled. During cooling the temperature of the obtained product is reduced with at least 40° C., preferably the temperature of the obtained product is reduced with at least 60° C. Preferably such cooling is done while the obtained product is still under pressure, e.g. the same pressure as used during compressing.

After cooling the so obtained product is flexed. During this flexing the composite material according to the invention is bent over a radius of 75 mm for at least 2 times, preferably 4 times on each side, along the unconsolidated elements.

The invention is further elucidated with drawings referred to as FIG. 1-FIG. 10.

FIG. 1 relates to a composite material according to the invention comprising compressed elements in the form of hexagon (grey shaded) and uncompressed elements (white shaded) which form a web around the compressed elements. The minimum width of the uncompressed area is depicted as 'U'. The shortest side of a consolidated element is depicted as 'S'.

FIG. 2 relates to a composite material according to the invention comprising compressed elements in the form of equilateral triangles (grey shaded) and uncompressed elements (white shaded) which form a web around the compressed elements.

FIG. 3 relates to a top view of a composite material according to the invention, showing locations where dimensions are determined, as further detailed in FIG. 4 and FIG. 5.

Figure 1:
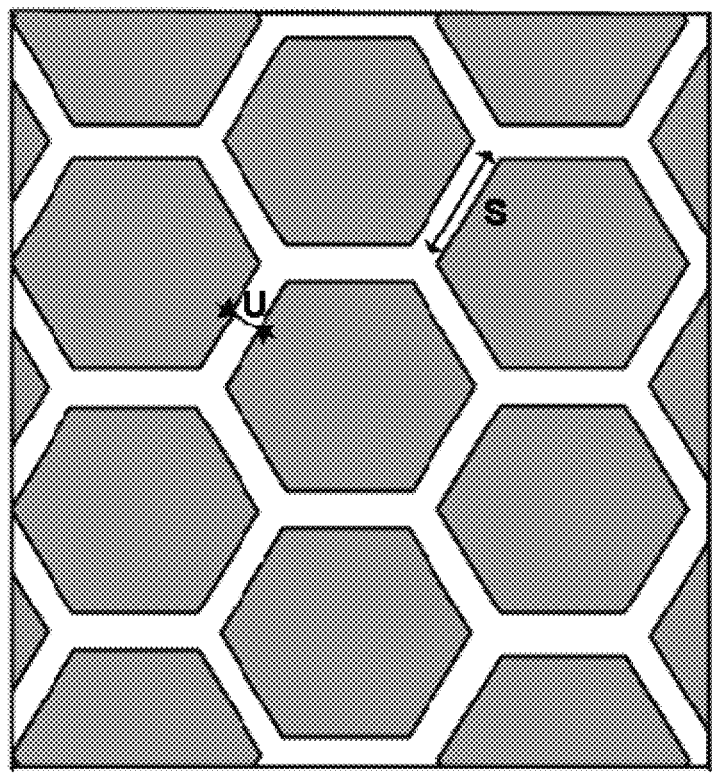
Figure 2:
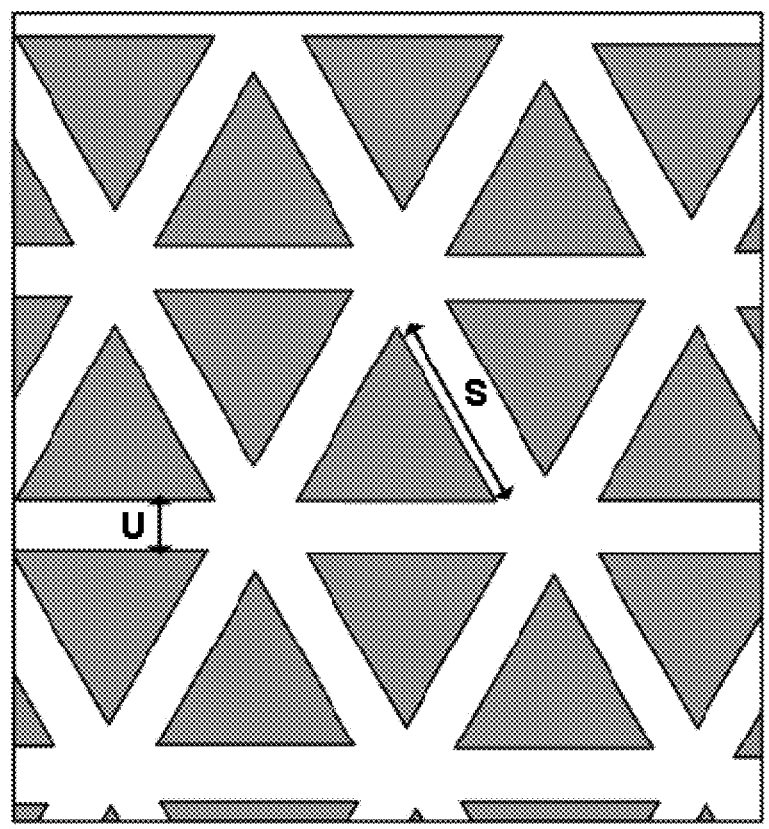
Figure 3:
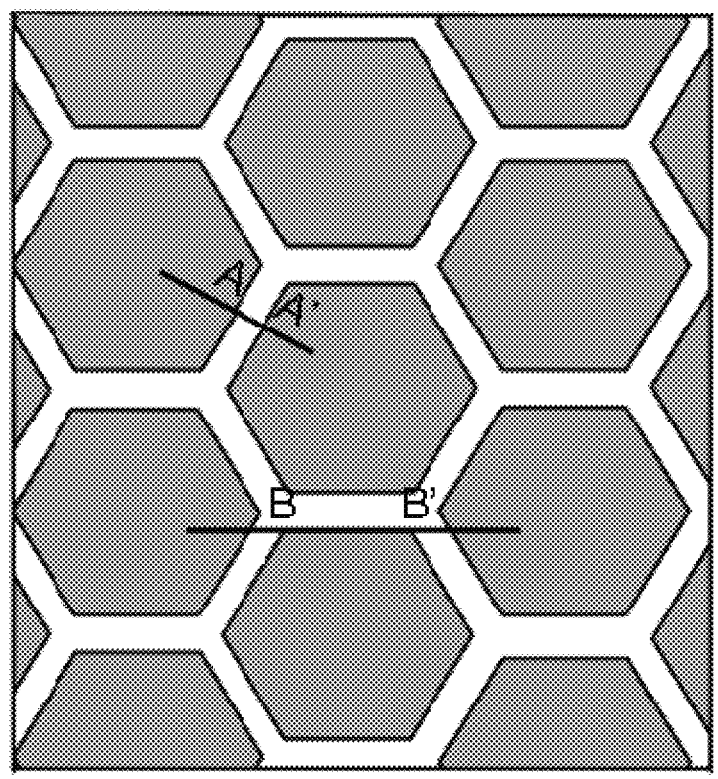
Figure 4:
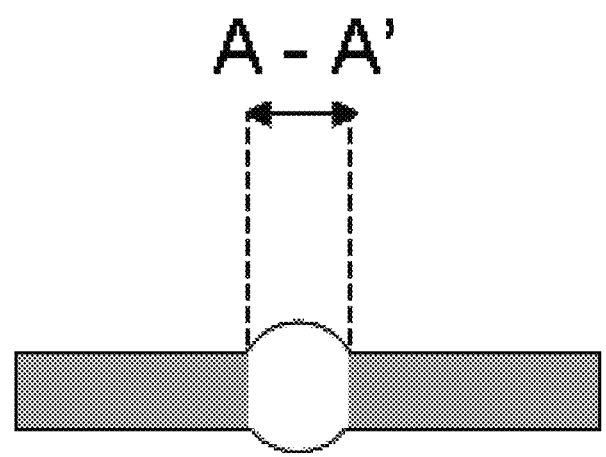
FIG. 4 shows where and how the width of an unconsolidated element is measured, along section A-A' (as shown in FIG. 3)
Figure 5:
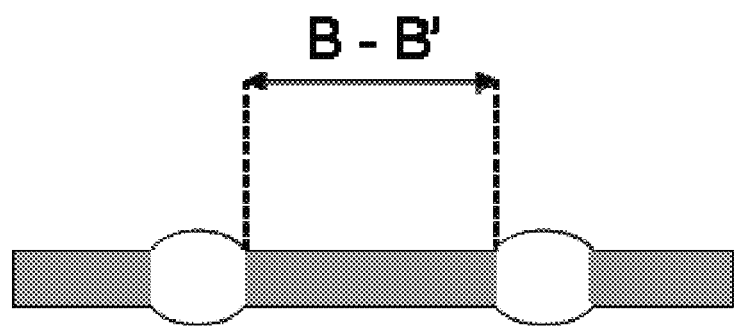
FIG. 5 shows where and how the length of a side of a consolidated element is measured, along section B-B' (as shown in FIG. 3)
Figure 6:
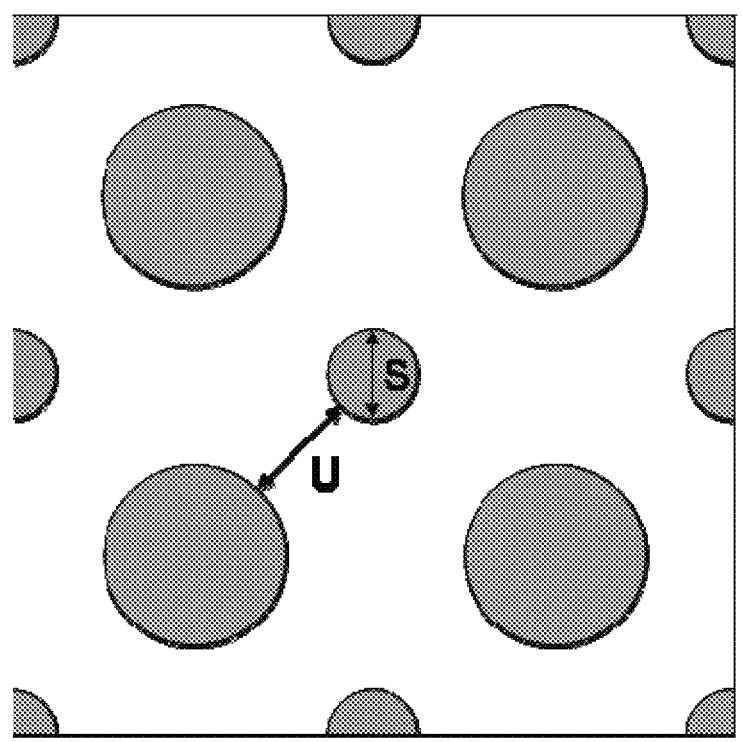
FIG. 6 shows compressed units in the forms of circles, not all circles having the same dimensions, and where the values of U and S are determined.
Figure 7:
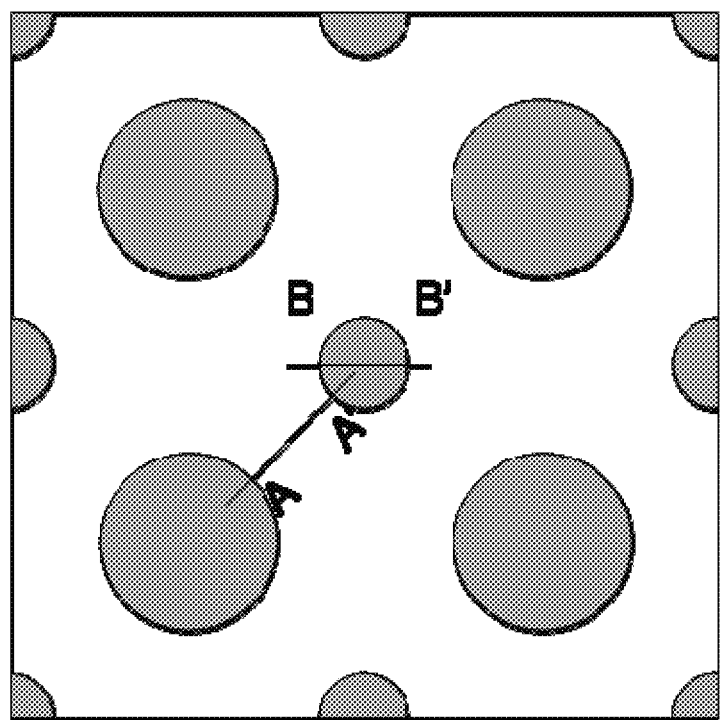
FIGS. 7, 8 and 9 show where and how measurement of dimensions is done in case of a circle.
Figure 8:
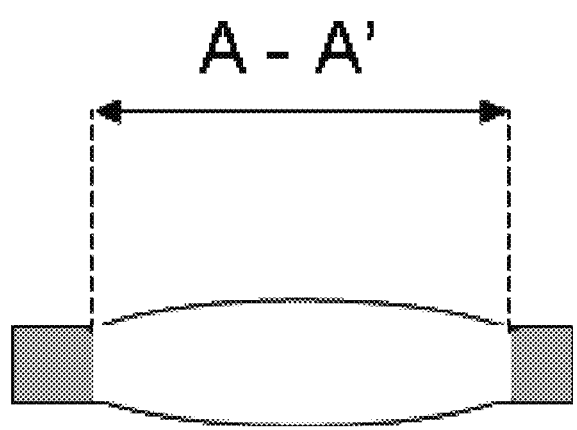
Figure 9:
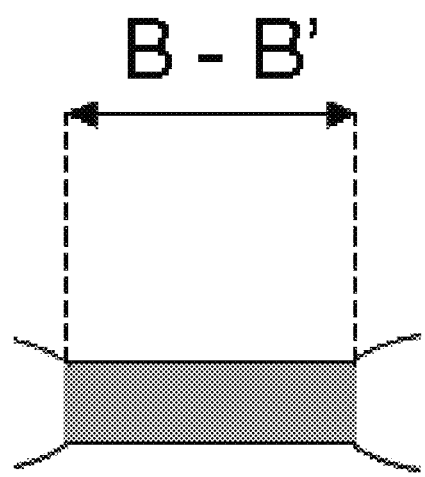

In this application the following test methods are used:
Intrinsic Viscosity (IV) for polyethylene is determined according to ASTM D-1601 at 135° C. in decalin, with a dissolution time of 16 hours, with DBPC as antioxidant in an amount of 2 g/l solution. IV is obtained by extrapolating the viscosity as measured at different concentrations to zero concentration.
Side chains in a polyethylene or UHMWPE sample is determined by FTIR on a 2 mm thick compression molded film by quantifying the absorption at 1375 $cm^{-1}$ using a calibration curve based on NMR measurements (as in e.g. EP 0 269 151)
Tensile strength and modulus of polymeric fibers are determined on multifilament yarns as specified in ASTM D885M, using a nominal gauge length of the fiber of 500 mm, a crosshead speed of 50%/min and Instron 2714 clamps, of type Fiber Grip D5618C. For calculation of the strength, the tensile forces measured are divided by the titer, as determined by weighing 10 meters of fiber; values in GPa for are calculated assuming the natural density of the polymer, e.g. for UHMWPE is 0.97 $g/cm^3$.
The tensile strength and tensile modulus of polymeric tapes are determined at 25° C. on tapes of a width of 2 mm as specified in ASTM D882, using a nominal gauge length of the tape of 440 mm, a crosshead speed of 50 mm/min.

Tensile modulus of binders and matrix materials was measured according to ASTM D-638(84) at 25° C.

The melting temperature (also referred to as melting point) of a polymer is determined by DSC on a power-compensation PerkinElmer DSC-7 instrument which is calibrated with indium and tin with a heating rate of 10° C./min. For calibration (two point temperature calibration) of the DSC-7 instrument about 5 mg of indium and about 5 mg of tin are used, both weighed in at least two decimal places. Indium is used for both temperature and heat flow calibration; tin is used for temperature calibration only.

Anti-ballistic performance: V50 and Eabs were determined at 21° C. with test procedures according to Stanag 2920, using 9 mm*19 mm FMJ Parabellum bullets (from Dynamit Nobel). After conditioning at 21° C. and 65% relative humidity during at least 18 hours, an anti-ballistic sample was fixed using flexible straps on a support filed with Caran D'Ache backing material, which was preconditioned at 35° C. The kinetic energy of the bullet at V50 was divided by the total areal density of the armor to obtain a so-called Eabs value. Eabs reflects the stopping power of the armor relative to its weight/thickness thereof. The higher the Eabs value, the better the anti-ballistic performance.

Flexibility was determined on samples having a disc-shape with 25 cm diameter. The disc samples were fixed horizontally at a surface of a flat desk, such as a table, with half of the sample supported on the desk and half of the sample protruding over the desk, so unsupported. A weight of 423 g was attached to the unsupported, free hanging, extremity of the disc. Five seconds after loading the weight, the distance of the free hanging extremity of the disc to the surface of the flat desk was measured.

Figure 10:
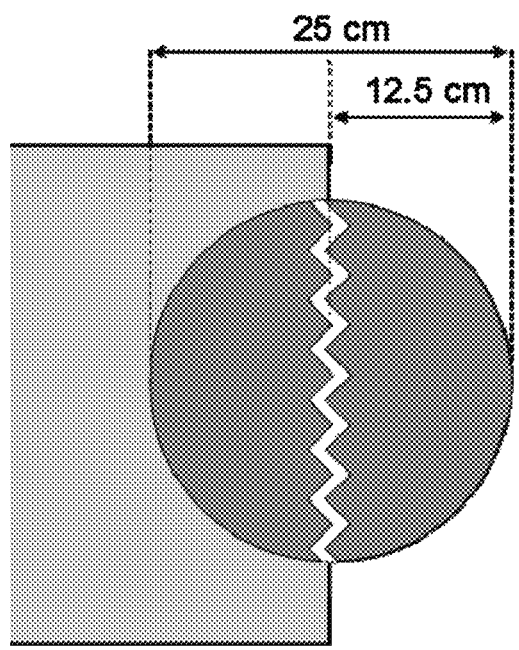
FIG. 10 shows a top view for measuring the flexibility of a circular disc on a flat desk at the right part of the drawing, as further explained herein below.

The test method is further highlighted in FIG. 10, where a top view is shown of the disc with a flat desk at the left side part of the drawing. In this disc one white area is included that represents some of the unconsolidated elements.

The surface area of the consolidated elements was determined by measuring the dimensions as shown in FIGS. 3 and 5 and FIGS. 7 and 9. The percentage of consolidated elements was determined by dividing the surface area of the consolidated elements and the total surface area of the flexible composite material. The percentage of the unconsolidated elements is (100%-percentage of consolidated elements)

The invention will now be further elucidated with the following examples and comparative experiment, without being limited hereto.

EXAMPLE 1

A composite material was made by stacking 19 layers of Dyneema® UD to obtain a stack of about 2.5 kg/m². Each layer Dyneema® UD comprises 2 monolayers with unidirectional polyethylene fibers, the layers being cross plied such that an angle between fibers in one layer and another layer is 90°. Strength of the polyethylene fibers is about 3.5 GPa and about 18 wt % of thermoplastic polyurethane matrix material was present.

The stack was put in a mould and pre-compressed for 5 minutes at 125° C. and a pressure of 2 MPa followed by pressing for 25 minutes at 125° C. and 7.5 MPa, and cooling under pressure at 7.5 MPa for 20 minutes. The so obtained product was flexed by bending it along the unconsolidated elements at a radius of 75 mm, 4 times on each side.

The mould was fitted at both its surfaces with a negative template in the form of an aluminum inlay with on its surface protruding equilateral triangles (with a height of 5 mm), whereby the length of each side of the triangle was 25.4 mm and the distance between the triangles 4 mm. This set up results in a composite material with a total surface area of compressed elements of 62%.

Anti-ballistic performance was determined by shooting with 9 mm Full Metal steel Jacket Parabellum bullets, either targeting the pressed or unpressed areas. Each result is the average of 3 shootings per sample. The results are given in table 1. Flexibility of the composite material was 74 mm.

EXAMPLE 2

Example 1 was repeated, whereby in this case two aluminum inlays were used with a distance U between the triangles of 8.5 mm. This set up results in a composite material with a total surface area of compressed elements of 40%. Flexibility of the composite material was 102 mm.

EXAMPLE 3

Example 1 was repeated, whereby in this case a aluminum inlays were used with equilateral hexagons whereby the length of a side of the hexagon was 21.7 mm with a distance U between the hexagons of 5.8 mm. This set up resulted in a composite material with a total surface area of compressed elements of 75%. The flexibility of the composite material was 65 mm.

EXAMPLE 4

Example 3 was repeated. In this case the distance U between the hexagons was 21.7 mm. This set up results in a composite material with a total surface area of compressed elements of 40%.

Flexibility of the composite material was 92 mm.

Comparative Experiment A

A composite material was made by stacking 19 layers of the same Dyneema® UD from comparative example 1 to obtain a stack of about 2.5 kg/m². The stack was put in a mould with flat surfaces and pressed for 25 minutes at 125° C. and 7.5 MPa, followed by cooling under pressure at 7.5 MPa for 20 minutes.

The obtained panel had a total compressed surface area of 100%.

Flexibility of the panel was 3 mm.

Comparative Experiment B

Comparative experiment A was repeated; however in this case the stack was not compressed.

The stack had a total compressed surface area of 0% and was put in a nylon woven envelope before it was subjected to ballistic testing.

Flexibility of the stack was more than 130 mm.

TABLE 1

| | Shooting area: | Eabs [J/kg/m²] | Surface area consolidated elements [%] |
|---|---|---|---|
| Comparative exp. A | pressed | 224 | 100 |
| Comparative exp. B | unpressed | 198 | 0 |

TABLE 1-continued

| | Shooting area: | Eabs [J/kg/m²] | Surface area consolidated elements [%] |
|---|---|---|---|
| Example 1 | unpressed part | 235 | 62 |
| | pressed part | 324 | |
| Example 2 | unpressed part | 257 | 40 |
| | pressed part | 340 | |
| Example 3 | unpressed part | 246 | 75 |
| | pressed part | 277 | |
| Example 4 | unpressed part | 249 | 40 |
| | pressed part | 361 | |

The above experiments show the composite material according to the invention to exhibit synergy compared to fully pressed or completely unpressed products. Such synergy has not been reported in WO2008/048301, nor in any other prior art.

A flexible composite material comprising consolidated and unconsolidated elements, showing a synergetic performance, with an Eabs of more than 200 against 9 mm Parabellum FMJ, as measured for an areal density of 2.5 kg/m², on any location of the flexible composite material has not been disclosed before.

Consequently the invention also relates to a flexible composite material comprising at least 2 layers comprising high strength fibers, said at least 2 layers comprise consolidated elements and unconsolidated elements, the composite material having an Eabs of more than 200 J/kg/m² on any location of the flexible composite material, preferably more than 225 J/kg/m², against 9 mm Parabellum FMJ.

Furthermore the invention preferably relates to a flexible composite material comprising at least 2 layers comprising high strength fibers, said at least 2 layers comprise consolidated elements and unconsolidated elements, the surface area of the consolidated elements is less than 80% of the total surface area of the flexible composite material and the composite material having an Eabs of more than 200 J/kg/m² against 9 mm Parabellum FMJ on any location of the flexible composite material.

Moreover the invention more preferably relates to a flexible composite material comprising at least 2 layers comprising high strength fibers, said at least 2 layers comprise consolidated elements and unconsolidated elements, the surface area of the consolidated elements is less than 75% of the total surface area of the flexible composite material and the composite material having an Eabs of more than 200 J/kg/m² against 9 mm Parabellum FMJ on any location of the flexible composite material.

The invention claimed is:

1. A flexible composite material comprising:
at least two fibrous layers comprised of high strength fibers, wherein the high strength fibers are formed of polyaramide or ultra-high molecular weight polyethylene, wherein
the at least two fibrous layers establish opposed surfaces of the composite material, wherein the flexible composite material includes consolidated elements and unconsolidated elements formed in each of the opposed surfaces of the at least two fibrous layers such that the consolidated and unconsolidated elements of one of the opposed surfaces are coincident with the consolidated and unconsolidated elements of another of the opposed surfaces, respectively, and wherein
each of the coincident consolidated elements establish a thickness of the material sheet which is less than a thickness of the material sheet established by the coincident unconsolidated elements, and wherein
a surface area of the unconsolidated elements is 60% or more of a total surface area of the flexible composite material.

2. The flexible composite material according to claim 1, further comprising a polymer sheet on at least one outer surface of the flexible composite material.

3. The flexible composite material according to claim 1, wherein the flexible composite material has an areal density of at least 400 g/m² and a flexibility of at least 25 mm.

4. The flexible composite material according to claim 1, wherein the consolidated elements are arranged in a regular pattern and the consolidated elements have a triangular, quadrilateral, pentagonal, hexagonal, circular or ellipsoidal shape.

5. The flexible composite material according to claim 1, wherein the unconsolidated elements are interconnected.

6. The flexible composite material according to claim 1, wherein the high strength fibers in the at least two layers are arranged in a parallel fashion in one layer of the at least two layers.

7. The flexible composite material according to claim 1, wherein the flexible composite material has a width and a length, and wherein the length is at least 5 times the width.

8. The flexible composite material according to claim 1, wherein the flexible composite material includes two outer surfaces and further comprises at least one polymeric film on at least one of the two outer surfaces thereof.

9. The flexible composite material according to claim 1, wherein the flexible composite material exhibits an Eabs of more than 200 J/kg/m² against 9 mm Parabellum FMJ, as measured for an areal density of 2.5 kg/m², on any location of the flexible composite material.

10. The flexible composite material according to claim 9, having an Eabs of more than 225 J/kg/m².

11. A ballistic resistant object comprising the flexible composite material according to claim 1.

12. A process for the manufacture of a flexible ballistic resistant composite material according to claim 1, comprising the steps of:
(a) providing at least two layers comprising the high strength fibers;
(b) consolidating the at least two layers to obtain the coincident consolidated elements and the coincident unconsolidated elements, wherein the unconsolidated elements have a smallest width U which is more than 4 mm;
(c) cooling the product obtained after step (b); and
(d) flexing the product obtained in step (c) along the unconsolidated elements over a radius of 75 mm for at least 2 times.

13. The process of claim 12, wherein the consolidation step (b) is practiced at least 10 degrees below a melting point of the high strength fibers at a pressure of at least 1.0 MPa.

14. A flexible composite material comprising:
at least two fibrous layers comprised of high strength fibers, wherein
the at least two fibrous layers establish opposed surfaces of the composite material, wherein the flexible composite material includes consolidated elements and unconsolidated elements formed in each of the opposed surfaces of the at least two fibrous layers such that the consolidated and unconsolidated elements of one of the opposed surfaces are coincident with the consolidated and unconsolidated elements of another of the opposed surfaces, respectively, and wherein each of the coincident consolidated elements establish a thickness of the material sheet which is less than a thickness of the material sheet established by the coincident unconsolidated elements, and wherein a surface area of the unconsolidated elements is 60% or more of a total surface area of the flexible composite material, and wherein the flexible composite material has an areal density of at least 400 g/m² and a flexibility of at least 25 mm.

15. The flexible composite material according to claim 14, wherein the high strength fibers are selected from the group of polyolefins; polyamides; polyaramides; poly(tetrafluoroethylene); poly{2,6-diimidazo-[4,5b-4',5'e]pyridinylene-1,4 (2,5-dihydroxy)phenylene}; poly(p-phenylene-2, 6-benzobisoxazole); poly(hexamethyleneadipamide), poly(4-aminobutyric acid); polyesters; polyvinyl alcohols and thermotropic liquid crystal polymers.

16. The flexible composite material according to claim 15, wherein the high strength fibers are formed of polyaramide.

17. The flexible composite material according to claim 15, wherein the high strength fibers are formed of ultra high molecular weight polyethylene.

18. A flexible composite material comprising:
at least two fibrous layers comprised of high strength fibers, wherein
the at least two fibrous layers establish opposed surfaces of the composite material, wherein the flexible composite material includes consolidated elements and unconsolidated elements formed in each of the opposed surfaces of the at least two fibrous layers such that the consolidated and unconsolidated elements of one of the opposed surfaces are coincident with the consolidated and unconsolidated elements of another of the opposed surfaces, respectively, and wherein each of the coincident consolidated elements establish a thickness of the material sheet which is less than a thickness of the material sheet established by the coincident unconsolidated elements, and wherein a surface area of the unconsolidated elements is 60% or more of a total surface area of the flexible composite material, and wherein the high strength fibers in the at least two layers are arranged in a parallel fashion in one layer of the at least two layers.

19. The flexible composite material according to claim 18, wherein the high strength fibers are selected from the group of polyolefins; polyamides; polyaramides; poly(tetrafluoroethylene); poly{2,6-diimidazo-[4,5b-4',5'e]pyridinylene-1,4 (2,5-dihydroxy)phenylene}; poly(p-phenylene-2, 6-benzobisoxazole); poly(hexamethyleneadipamide), poly(4-aminobutyric acid); polyesters; polyvinyl alcohols and thermotropic liquid crystal polymers.

20. The flexible composite material according to claim 19, wherein the high strength fibers are formed of polyaramide.

21. The flexible composite material according to claim 19, wherein the high strength fibers are formed of ultra high molecular weight polyethylene.

* * * * *